United States Patent [19]

Owen et al.

[11] Patent Number: 5,143,875
[45] Date of Patent: Sep. 1, 1992

[54] BUBBLING DENSE BED CATALYST REGENERATOR WITH HIGHER EFFICIENCY BASE REGION

[75] Inventors: Hartley Owen, Belle Mead, N.J.; Paul H. Schipper, Wilmington, Del.

[73] Assignee: Mobil Oil Corporation, Fairfax, Va.

[21] Appl. No.: 651,173

[22] Filed: Feb. 6, 1991

[51] Int. Cl.$^5$ .................... B01J 38/34; B01J 21/20; C10G 11/18; F27B 15/08

[52] U.S. Cl. .................. 502/43.000; 34/57 A; 208/113; 422/144; 502/40; 502/41

[58] Field of Search ................. 502/41–43, 502/40; 208/113, 164

[56] References Cited

U.S. PATENT DOCUMENTS

| | | | |
|---|---|---|---|
| 2,366,372 | 1/1945 | Voorhees | 502/41 |
| 2,595,909 | 5/1952 | Trainer et al. | 208/164 |
| 3,817,280 | 6/1974 | Celani | 137/592 |
| 4,051,069 | 9/1977 | Bunn, Jr. et al. | 502/43 |
| 4,056,486 | 11/1977 | Bunn, Jr. et al. | 502/42 |
| 4,071,573 | 1/1978 | Owen et al. | 260/688 |
| 4,624,771 | 11/1986 | Lane et al. | 208/74 |

*Primary Examiner*—Paul E. Konopka
*Attorney, Agent, or Firm*—Alexander M. McKillop; Charles J. Speciale; Richard D. Stone

[57] ABSTRACT

A process and apparatus for fluidized bed catalyst regeneration. The regenerator contains a base fluidized bed, a bubbling dense bed above the base fluidized bed, and a dilute phase region above the bubbling dense bed. The bubbling dense bed has a larger cross sectional area than the base bed. Most, preferably all, the regeneration gas is added to the base fluidized bed. Higher superficial vapor velocities in the base fluidized bed, with conventional vapor velocities in the bubbling dense bed, allow more efficient regeneration in the base bed, without excessive catalyst entrainment into the dilute phase. Regenerated catalyst may be recycled from the bubbling dense bed or the dilute phase to the base fluidized bed, preferably via a cyclone dipleg.

6 Claims, 3 Drawing Sheets

BUBBLING DENSE BED CATALYST REGENERATOR WITH HIGHER EFFICIENCY BASE REGION

BACKGROUND OF THE INVENTION

1. Field of the Invention

The invention relates to the regeneration of fluidized catalytic cracking catalyst.

2. Description of Related Art

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425° C.–600° C., usually 460° C.–560° C. The hydrocarbons crack, and deposit carbonaceous hydrocarbons or coke on the catalyst. The cracked products are separated from the coked catalyst. The coked catalyst is stripped of volatiles, usually with steam, and is then reqenerated. In the catalyst regenerator, the coke is burned from the catalyst with oxygen containing gas, usually air. Coke burns off, restoring catalyst activity and simultaneously heating the catalyst to, e.g., 500° .C–900° C., usually 600° C.–750° C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. Although there are myriad individual variations, typical designs are shown in U.S. Pat. No. 3,849,291 (Owen) and U.S. Pat. No. 3,894,934 (Owen et al), and U.S. Pat. No. 4,368,114 (Chester et at.) which are incorporated herein by reference.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units of this type are shown in U.S. Pat. No. 3,926,778 (which is incorporated by reference) and many other recent patents. The H.E.R. design is used in most new units because it permits operation of an FCC with less catalyst inventory (and hence less catalyst loss and lower catalyst makeup), and because such units tend to have both less CO emissions and less NOx emissions than the single dense bed regenerators.

Unfortunately, it has not been economically justifiable to convert older style, single dense bed regenerators to the modern H.E.R. design because of the high capital cost associated with simply scrapping the old single bed regenerator. Attempts to simply use the old single stage regenerator as part of a modern two stage, H.E.R. design have not been too successful, as the old single stage units are much larger than either of the beds in an H.E.R. unit. Another complication has been that many of the older units do not have cyclone separators which are adequate to deal with the increased catalyst traffic associated with high efficiency regenerators.

The problems are especially severe in those units with a central catalyst withdrawal point. Typically the catalyst is added to impart a swirling motion to spent catalyst in the regenerator, with regenerated catalyst withdrawn from the center, or near the center of the regenerator vessel. Those units using an overflow well, to minimize bypassing of spent catalyst have severe flow distribution problems, and also devote much of the volume of the regenerator bed to holding the overflow well. This represents a significant loss of some of the most active volume available in the bubbling dense bed for regeneration of spent catalyst.

To increase the coke burning capacity of these older units, and to minimize CO emission, many now use CO combustion promoters. This reduces CO emissions, but usually increases nitrogen oxides (NOx) in the regenerator flue gas. It is difficult in a catalyst regenerator to completely burn coke and CO in the regenerator without increasing the NOx content of the regenerator flue gas. The problem of NOx emissions is more severe in bubbling dense bed regenerators than in high efficiency regenerators because there can be localized high oxygen concentrations due to passage of much of the regeneration gas through the bed in the form of relatively large bubbles. Poor spent catalyst flow patterns make the NOx problem even worse, in that excessive amounts of air are needed to achieve complete CO combustion, but this increased air flow rate makes NOx emissions worse. Heavier feeds, which generally have even higher nitrogen levels, only make the problems of adequate coke burning capacity and NOx emissions even worse.

We wanted a way to improve the efficiency of catalyst regeneration in bubbling dense bed regenerators, in a way that would permit more coke to be burned. We want to use most, if not all, of the existing regenerator vessel, and in such a way that fines in the flue gas from the unit would not be increased, so that no additional stages of cyclone separation would be required. We knew this called for contradictory steps, because increased air rates which improve fluidization or more coke burning increase particulates emissions.

We discovered a way to overcome many of the deficiencies of bubbling dense bed regenerators while retaining their admirably low particulates emissions characteristics.

BRIEF SUMMARY OF THE INVENTION

Accordingly, the present invention provides a process for regenerating spent cracking catalyst containing coke by burning the coke with a regeneration gas in two contiguous dense phase fluidized beds maintained in a single regenerator vessel, an upper bubbling fluidized bed operating at bubbling fluidized bed regeneration conditions including a superficial vapor velocity and a lower dense phase fluidized bed operating at fluidized bed regeneration conditions including a superficial vapor velocity at least 15% greater than the superficial vapor velocity in said upper bubbling bed, and wherein said lower dense phase fluidized bed is open to and covered by said upper bubbling dense bed; by partially regenerating at least a majority of said spent catalyst in said lower dense phase fluidized bed by adding to a lower portion of said lower dense bed a majority of the regeneration gas, at least partially regenerating said spent catalyst to produce at least partially regenerated catalyst and flue gas containing oxygen and discharging partially regenerated catalyst and oxygen containing flue gas from said lower dense bed up into said upper bubbling dense bed said; and completing catalyst regeneration in said bubbling dense phase upper bed by burning additional coke from said partially regenerated catalyst with said oxygen containing flue gas from said lower dense bed to produce regenerated catalyst in said bubbling dense bed and withdrawing from said upper bubbling dense bed reqenerated catalyst as a product of the process.

In an apparatus embodiment, the present invention provides an apparatus for the fluidized bed regeneration of coke contaminated spent catalyst from a fluidized catalytic cracking process by contact with a regeneration gas to produce regenerated catalyst, comprising a single regenerator vessel having an inlet for spent catalyst connective with said regenerator vessel and adapted to maintain said catalyst in three superimposed, contiguous fluidized zones: a base dense phase fluidized bed zone, in a lower portion of said vessel having an average cross sectional area, having an inlet in a lower portion for regeneration gas; a bubbling dense bed zone above and in open fluid communication with said base zone, said bubbling bed zone having an average cross sectional area at least 20% greater than the cross sectional area of said base zone, said bubbling dense bed zone comprising a regenerated catalyst withdrawal means; and a dilute phase zone in an upper portion of said vessel and above said bubbling bed zone comprising a flue gas withdrawal means.

DETAILED DESCRIPTION

The invention can be better understood with reference to the Figures.

Regenerator 1 (prior art) is a conventional single dense bed swirl type regenerator, similar to that shown in U.S. Pat. No. 3,904,548 or U.S. Pat. No. 3,817,280. There are many other similar regenerators which have a generally central regenerated catalyst withdrawal point, and with addition of spent catalyst to one side of the regenerator, but not all of these will have the strong swirl patterns exhibited by the design shown in FIGS. 1 and 2.

Figure 1:
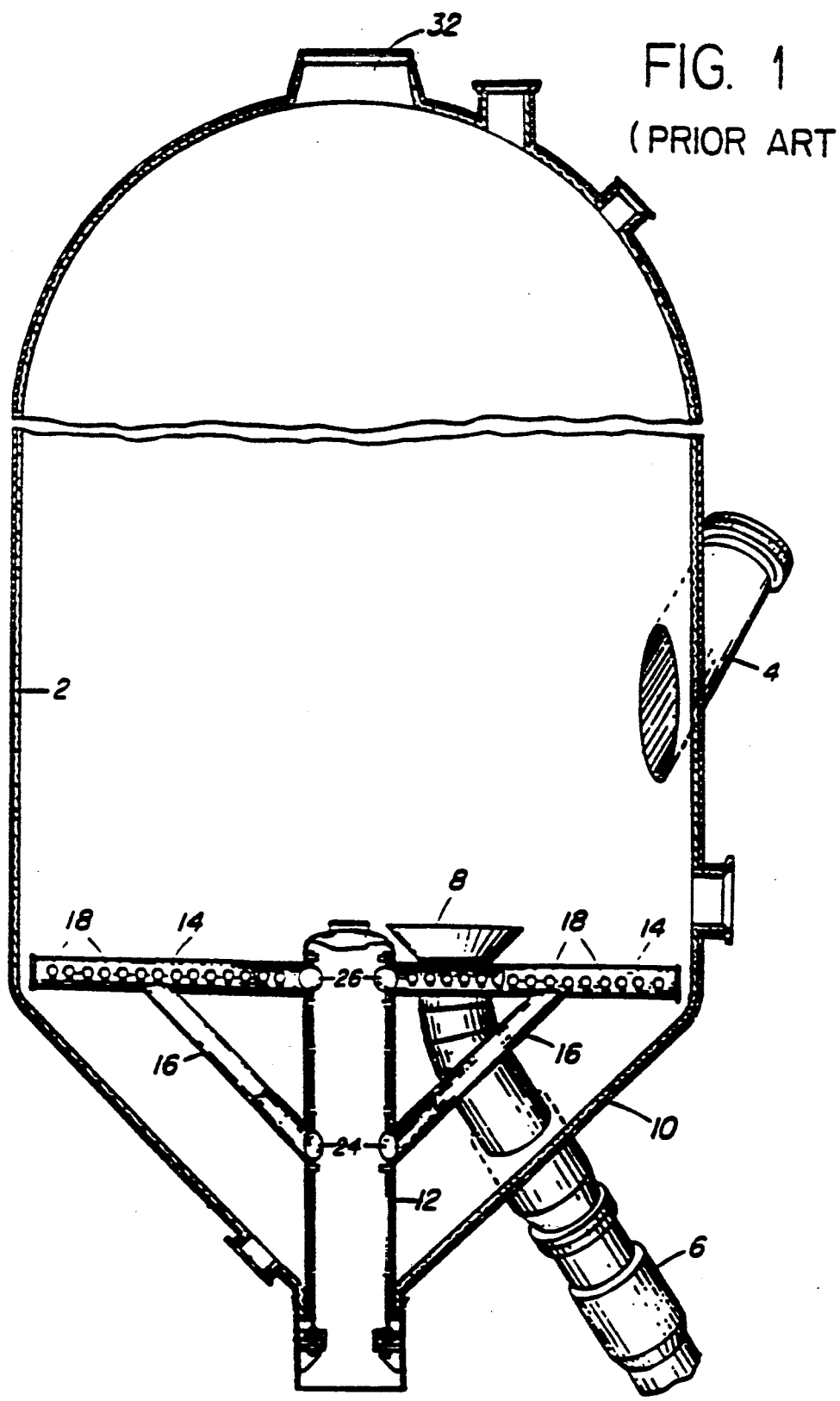
FIG. 1 (Prior Art) is a simplified, cross-sectional view of a conventional bubbling dense bed regenerator.

FIG. 1 shows in elevation a regeneration vessel 2 comprising a regeneration gas distributor means with flow control valve means in the inlet of each supply conduit to a given regeneration gas distributing means. Cyclones with diplegs are normally used, but are not shown to simplify the drawing. A catalyst inlet conduit 4 introduces spent catalyst. Conduit 4 preferably is positioned to provide for tangential introduction of spent catalyst, but it may discharge catalyst straight in to the center of the vessel. Conduit 6 extends up into the vessel and terminates in a funnel shaped mouth 8 above the air grid for withdrawing regenerated catalyst from the vessel. Sometimes the catalyst withdrawal outlet is called the "bathtub". In the embodiment shown the bathtub is somewhat off center, but in other designs it will be at the center of, or within 1/10 the diameter of, vessel 2. In many units a generally vertical catalyst withdrawal well is used in the center, so that regenerated catalyst overflows into the central withdrawal well for recycle to the catalytic cracking reactor.

Vessel 2 has a conical bottom 10. Regeneration air passes via lines 12 and 14 to distributor pipes 18. Flow through each conduit can be controlled by valves, not shown, if desired. Supports 16 help hold the considerable weight of the air distributor. Regeneration air passes out through holes or nozzles along the bottom surface of the pipes 18 and then up through a bed of catalyst. The catalyst is maintained as a bubbling, dense phase fluidized bed. Regenerated catalyst is withdrawn via regenerated catalyst outlet 8 communicating with conduit 6. The catalyst outlet 6 may be as shown in FIG. 1, but frequently is extended up into the vessel so that regenerated catalyst is withdrawn from an upper portion of the dense bed of catalyst rather than near the air grid as shown in FIG. 1. Flue gas after passing through cyclones, not shown, passes into a plenum chamber not shown and exits the top of the regenerator via opening 32.

Figure 2:
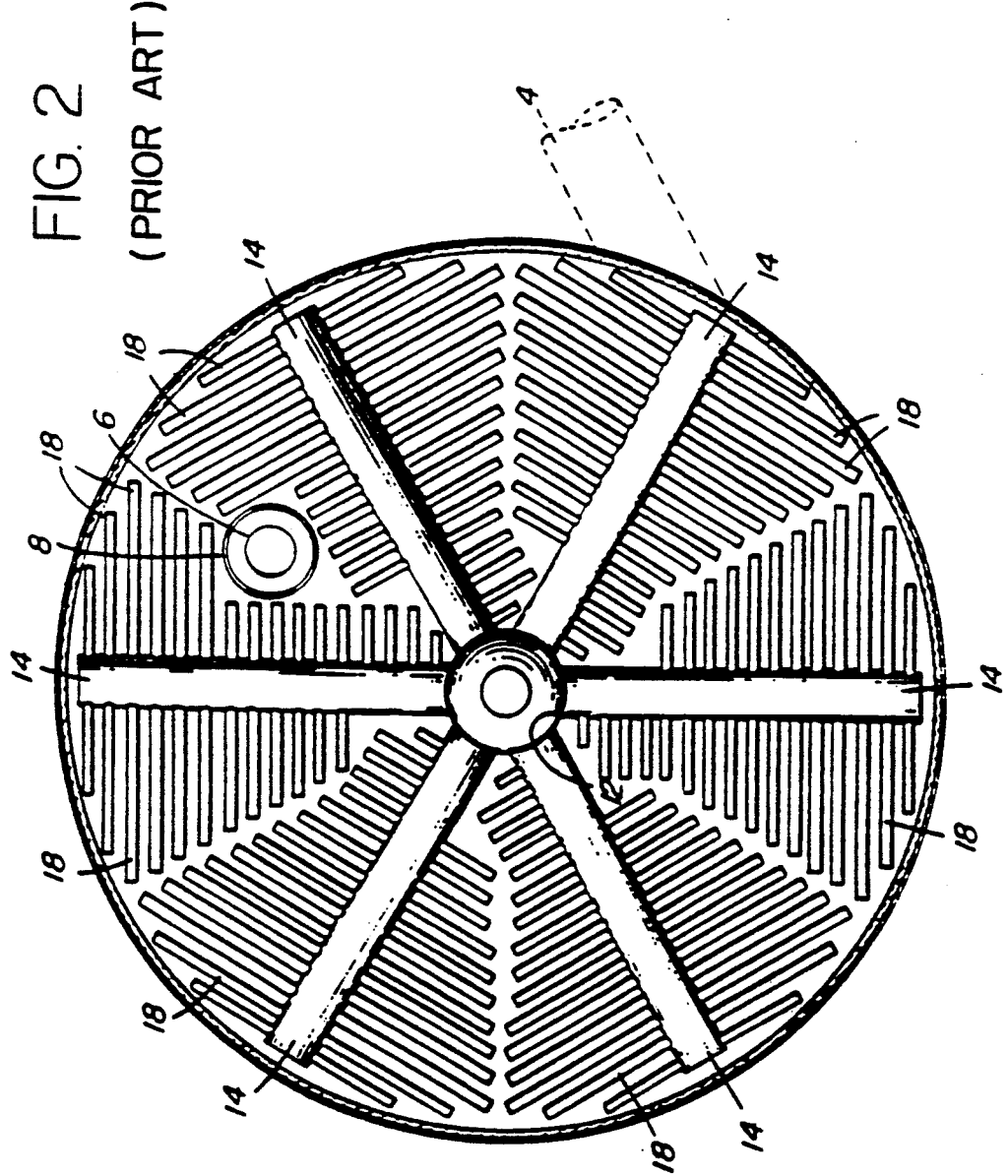
FIG. 2 (Prior Art) is a cross-sectional view of the bubbling dense bed regenerator shown in U.S. Pat. No. 3,817,280.

FIG. 2 (prior art) shows the segmented regeneration gas distributor grid comprising pipes 18, distributing conduits 14 and inlet conduit 12. Catalyst outlet 8 is between two of the segmented distributing grids. The dotted conduit 4 at the side of the drawing is shows the tangential addition of spent catalyst.

Figure 3:
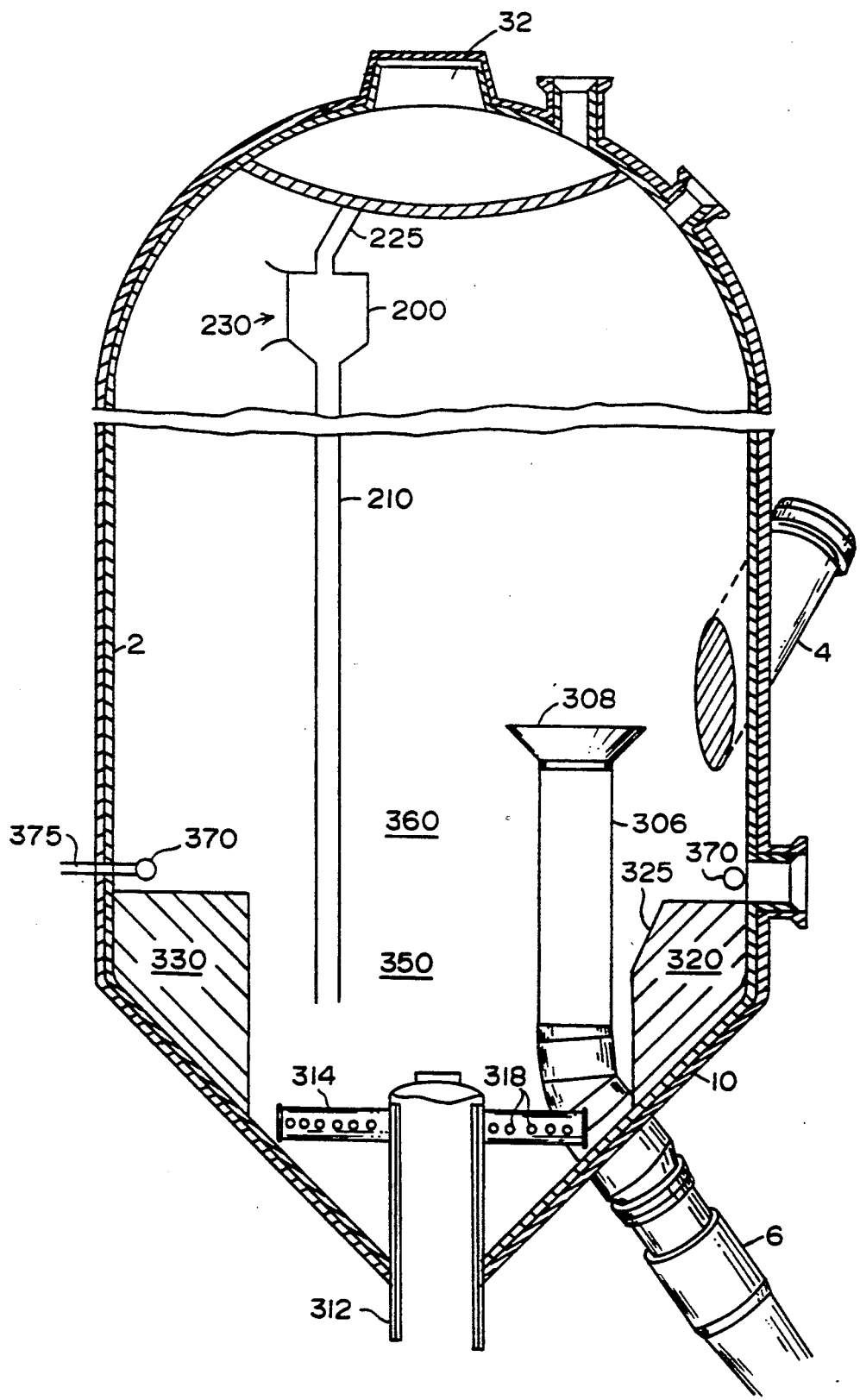
FIG. 3 (Invention) is a simplified, cross-sectional view of a bubbling dense bed regenerator of the invention, with a reduced diameter base, catalyst recirculation to the base, and an eccentric regenerated catalyst return line.

FIG. 3 shows one preferred embodiment of the present invention, a swirl type regenerator similar in many respects to the FIG. 1 regenerator, but with a higher superficial vapor velocity base section in the base.

The FIG. 3 embodiment uses much of the equipment of the FIG. 1 regenerator, and like elements have like reference numerals.

The spent catalyst is still added via line 4, but it's momentum carries it down to a more intensely fluidized bed region 350. Region 350 can be created in the base of the old regenerator vessel shell 10, by placing firebrick, concrete, steel, or some other filler in region 330. Preferably the filled region 350 extends uniformly about the regenerator vessel, save for a notched portion 320 with reduced height region, shown as 325, for admission of spent catalyst.

Regenerated catalyst is withdrawn from bubbling dense bed 360 via withdrawal means 308 situated on an extension 306 of old outlet line 6. Bed 360 preferably comprises one or more means for addition of fluffing and/or regeneration air, shown as air line 375 connective with air ring 370. Usually some fluffing air will be needed to keep the bed 360 from settling too much around the edges, and some additional coke combustion can also be achieved in this way. Better use will normally be made of regeneration air when it is added at the base of region 350, because the higher superficial vapor velocities, and more vertical orientation, permit better regeneration gas/catalyst contact.

Region 350 will always be better aerated and better fluidized than bubbling fluidized bed 360. Region 350 may be a bubbling, or perhaps a turbulent fluidized bed. The upper limit on fluidization, or more strictly speaking on superficial vapor velocity, in region 350, is the ability of bubbling dense bed 360 to contain the faster fluidized bed 350. Operating with conventional amounts of catalyst in inventory, it will usually not be possible to operate region 350 as a fast fluidized bed, and it will never be possible to operate region 350 as a dilute phase bed. Operating with too high a superficial vapor velocity in region 350 will inordinately increase the catalyst traffic in the dilute phase region above bubbling dense bed 360, because the dilute phase material will come through like a geyser or fountain.

Preferably the spent catalyst is preferentially added to the region 350, either relying on the geometry of the regenerator vessel or by extending pipe 4. Alternatively the spent catalyst may be added to the bubbling dense bed, region 360, with reliance of natural circulation to sweep spent catalyst into the faster fluidized region 350.

Most, and preferably at 90-100% of the combustion air or regeneration gas is added to the base of region 350 via inlet 312 and conventional distribution means such as pipes 314 and 318. The size of the air grid in region 350 will be much smaller than the air grid used in the FIG. 1 regenerator. The same amount of air can be added using a smaller air grid by using larger holes in the nozzles, or more holes. Even though the air grid or air distribution system used in the present invention is smaller than that used in the prior art, it is more tolerant of broken nozzles, poor design, etc. By this we mean that the region 350 does much of the job of distributing combustion air, rather than relying on perfect air distribution to myriad points in a bubbling dense bed.

Region 350 may have a cross sectional area of 25 to 90% of that of the bubbling dense bed region 360. Preferably region 35 has 30 to 80%, and most preferably 40 to 75%, of the cross sectional area of the bubbling dense bed.

Region 350 can be a generally vertical cylinder, as shown, save for any notching to admit spent catalyst, or may have any other suitable geometry, i.e., it can have regions of increasing or decreasing cross sectional area.

Preferably some hot regenerated catalyst is recycled to the faster fluidized bed region, to rapidly heat up spent catalyst. One of the most effective ways to heat spent catalyst is to simply seal the dipleg of one or more cyclones within region 350. A single stage of cyclone separation is shown in FIG. 3, with cyclone 200 having inlet 230 to the dilute phase region above bubbling dense bed 360. The cyclone recovers hot regenerated catalyst and returns it via dipleg 210 to faster fluidized bed region 350. Flue gas is discharged via outlet 225 to the plenum and exit line 32.

Cyclones are invariably present in FCC regenerators, and invariably have diplegs, many of which are sealed by immersion in the bubbling fluidized bed. By extending the dipleg slightly, as shown, it is possible to preferentially recycle catalyst to the faster fluidized bed region at essentially no capital or operating cost. The catalyst recovered via the cyclones is usually the hottest catalyst in the regenerator, and has very favorable fluidization characteristics. When the unit is upset, and for some reason not all of the coke is being burned, and afterburned within the fluidized beds 350 and 360, the catalyst recovered via the cyclones will be much hotter than catalyst in the fluidized beds, because of dilute phase afterburning. The process and apparatus of the present invention have very favorable characteristics for responding to dilute phase afterburning in that if the faster fluidized bed region gets behind in coke burning, causing unwanted dilute phase afterburning, the recycle of much hotter catalyst from the dilute phase region will greatly promote coke combustion in the faster fluidized bed region 350.

Catalyst may also be recycled from the bubbling dense bed region 360 by a separate recycle means not shown, or by a recycle line permitting some hot, regenerated catalyst to be withdrawn from line 6 and charged to the air inlet 12. This has the advantage of minimizing capital costs for recycle, and permits a slide valve to be used to control catalyst recycle.

The process and apparatus of the present invention is significant both for what it does and for what it does not do. The invention achieves better fluidization, more vigorous mixing and reduced "bubble" size in the faster fluidized bed region as compared to the covering bubbling dense bed region.

The invention does not require an increase in superficial vapor velocity through the bubbling dense bed, nor need it entrain more catalyst in the dilute phase region above the bubbling dense bed.

The invention requires minimal or no change to the exterior of the regenerator shell 10. It is possible to operate with the old catalyst inlet and outlet lines, and the same combustion air inlet, save perhaps for the addition of fluffing air ring 370 or an equivalent fluffing means.

Process Condition—360

The conditions in bed 360, the bubbling, dense phase fluidized bed region, can be conventional. The only difference will normally be that a well dispersed (and partially consumed) supply of combustion air will tend to well up from the central portion of the regenerator, rather than being uniformly added through an air grid traversing the entire cross section of the regenerator.

Process Contition—BED 350

Conditions in the "faster" fluidized bed region 350 are set to some extent by the conditions which can be tolerated in covering bed 360 and by the geometry of bed 35. In general, the superficial vapor velocity in region 350 above the air grid will be about 3.5 to 10 fps, and preferably 4 to 8 fps, and most preferably 4.5 to 6 fps. Catalyst densities will usually be about 10 to 35 $lb/ft^3$, preferably 12 to 30 $lb/ft^3$, and most preferably 15 to 25 $lb/ft^3$.

In general, the superficial vapor velocity in the "faster" fluidized bed will be at least about 115% of the superficial vapor velocity in the covering bubbling dense bed. Preferably the vapor velocity in the lower fluidized bed is about 120 to 333%, and most preferably about 133 to 266% of the superficial vapor velocity in the upper, bubbling dense bed.

At least 50% of the combustion air should be added to the base of this region, and preferably at least 90%, and most preferably all. This is exclusive of fluffing air added to keep the bubbling dense bed aerated.

The relative superficial vapor velocities will usually be similar to the relative cross sectional areas, unless a significant amount of regeneration gas is added to the upper, or bubbling bed. Even when all the regeneration gas is added to the lower or "faster" fluidized bed, the volume of gas in the upper or bubbling dense bed will usually be slightly larger than that added to the lower bed. This is because there will usually be some fluffing air added to the bubbling dense bed, and there will also be a slight expansion of the gas due to higher temperatures. If the upper bed is, e.g., twice as large as the lower bed, this geometry will usually require more fluffing air. For these reasons the ratio of relative cross sectional area will usually be slightly different from the ratios of superficial vapor velocity. Expressed as relative areas, the upper, bubbling dense bed should have at least about 120% of the cross sectional area of the base zone, and preferably about 125 to 350%, and most preferably 133 to 300% of the average cross sectional area of the base zone.

Process Benefits

The regenerator process and apparatus of the present invention can be readily added to existing FCC single dense bed regenerators with minimal changes to the unit. Although the regeneration process and apparatus of the present invention will not equal the performance of a new "high efficiency regenerator" the performance will be far superior to that of conventional bubbling dense bed regenerators. The unit will be able to produce cleaner catalyst, or regenerate more catalyst than would be possible in a conventional bubbling dense bed regenerator with a similar footprint or cross sectional area. The better contacting of spent catalyst and regeneration gas, and significantly reduced bubble size in the faster fluidized bed base region will reduce NOx emissions relative to bubbling bed regenerator designs.

In a regenerator of the present invention, the high L/D ratio at the air inlet, and the high traffic of catalyst and gas in the "faster fluidized bed" base region allow use of a lower pressure drop air distributor. The "faster fluidized bed" region tolerates poor air distribution, whereas conventional bubbling fluidized beds do not. The regenerator of the present invention will have relatively low particulates emissions, because the catalyst traffic in the dilute phase region will be determined primarily by the superficial vapor velocity in the upper, bubbling dense bed, rather than the lower "faster fluidized bed" region. The benefits of higher vapor velocity regeneration can be achieved, without the drawbacks of simply increasing the air rate to conventional single bed regenerators.

We claim:

1. A process for regenerating spent cracking catalyst containing coke by burning the coke with a regeneration gas in two contiguous dense phase fluidized beds maintained in a single regenerator vessel, an upper bubbling fluidized bed having a cross sectional area and operating at bubbling fluidized bed catalyst regeneration conditions including a superficial vapor velocity and a lower dense phase fluidized bed, having a cross sectional area of 25 to 90% of the cross sectional area of said upper bubbling fluidized bed, and operating at fluidized bed catalyst regeneration conditions including a superficial vapor velocity at least 15% greater than the superficial vapor velocity in said upper bubbling bed, and wherein said lower dense phase fluidized bed is open to and covered by said upper bubbling dense bed; by adding said spent catalyst, as a stream flowing down from a spent catalyst inlet at an elevation above said lower dense bed, and wherein at least 90% of said spent catalyst is carried by its momentum through said upper bubbling dense bed to said lower dense bed;

heating said spent catalyst in said lower dense bed by recycling to said lower dense bed not regenerated catalyst by a catalyst recycle means;

partially regenerating at least a majority of said spent catalyst in said lower dense phase fluidized bed at catalyst regeneration conditions including a superficial vapor velocity of about 3.5 to 10 fps and temperature of 500° to 900° C. by adding to a lower portion of said lower dense bed a majority of the regeneration gas, at least partially regenerating said spend catalyst to produce at least partially regenerated catalyst and flue gas containing oxygen and discharging partially regenerated catalyst and oxygen containing flue gas from said lower dense bed up into said upper bubbling dense bed said; and completing catalyst regeneration in said bubbling dense phase upper bed at catalyst regeneration conditions including a lower superficial vapor velocity than said lower dense bed and a temperature of 500° to 900° C. by burning additional coke from said partially regenerated catalyst with said oxygen containing flue gas from said lower dense bed to produce regenerated catalyst in said upper bubbling dense bed; and withdrawing from said upper bubbling dense bed regenerated catalyst as a product of the process.

2. The process of claim 1 wherein at least 90% of the total regeneration gas, exclusive of fluffing air, is added to said lower portion of said lower dense bed.

3. The process of claim 1 wherein essentially all of the regeneration gas, exclusive of fluffing air, is added to said lower portion of said lower dense bed.

4. The process of claim 1 wherein said regenerator comprises at least one cyclone, in a dilute phase region above said bubbling dense phase bed, which recovers entrained catalyst from flue gas and discharges recovered catalyst via a cyclone dipleg and said cyclone dipleg has an outlet below said upper bubbling dense bed which is immersed in said lower fluidized dense bed as said catalyst recycle means.

5. The process of claim 1 wherein the superficial vapor velocity in said lower fluidized bed is 120 to 333% of the superficial vapor velocity in said upper bubbling dense bed.

6. The process of claim 1 wherein the superficial vapor velocity in said lower fluidized bed is 133 to 266% of the superficial vapor velocity in said upper bubbling dense bed.

* * * * *

UNITED STATES PATENT AND TRADEMARK OFFICE
CERTIFICATE OF CORRECTION

PATENT NO. : 5,143,875

DATED : September 1, 1992

INVENTOR(S) : Hartley Owen and Paul H. Schipper

It is certified that error appears in the above-identified patent and that said Letters Patent is hereby corrected as shown below:

Column 8, line 6, claim 1, "not regenerated" should be --hot regenerated--

Column 8, line 15, claim 1, "spend" should be --spent--

Signed and Sealed this

Twelfth Day of October, 1993

Attest:

BRUCE LEHMAN

Attesting Officer     Commissioner of Patents and Trademarks